United States Patent [19]

Lotsch et al.

[11] 4,340,735
[45] Jul. 20, 1982

[54] ISOINDOLINE COLORANTS

[75] Inventors: Wolfgang Lotsch, Beindersheim; Reinhard Kemper, Heidelberg, both of Fed. Rep. of Germany

[73] Assignee: BASF Aktiengesellschaft, Ludwigshafen, Fed. Rep. of Germany

[21] Appl. No.: 227,251

[22] Filed: Jan. 22, 1981

[30] Foreign Application Priority Data

Feb. 27, 1980 [DE] Fed. Rep. of Germany ........ 3007329

[51] Int. Cl.³ .......................................... C09B 57/04
[52] U.S. Cl. .................................... 544/300; 106/22; 106/288 Q; 544/284; 544/296; 524/83; 524/93; 524/94
[58] Field of Search ...................... 544/284, 296, 300

[56] References Cited

U.S. PATENT DOCUMENTS

| | | | |
|---|---|---|---|
| 3,794,659 | 2/1974 | Leister et al. ...................... | 548/159 |
| 4,051,099 | 9/1977 | Von der Crone ................ | 260/326.1 |
| 4,262,120 | 4/1981 | Von der Crone ................ | 544/284 |

FOREIGN PATENT DOCUMENTS

| | | |
|---|---|---|
| 2814526 | 10/1978 | Fed. Rep. of Germany. |
| 2135259 | 5/1972 | France. |
| 2386588 | 4/1978 | France. |
| 1187667 | 8/1967 | United Kingdom. |
| 2013230 | 8/1979 | United Kingdom. |

*Primary Examiner*—Paul M. Coughlan, Jr.
*Attorney, Agent, or Firm*—Oblon, Fisher, Spivak, McClelland & Maier

[57] ABSTRACT

Isoindoline colorants of the formula

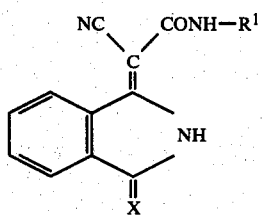

where $R^1$ is the radical of a 5-membered or 6-membered heterocyclic unsaturated ring, which may or may not be fused to a benzo ring, X is

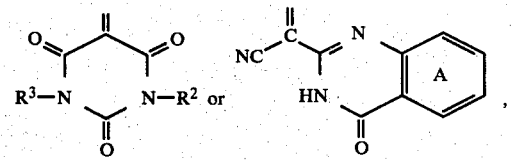

$R^2$ and $R^3$ independently of one another are hydrogen, $C_1$-$C_4$-alkyl, benzyl, phenyl or 1-naphthyl, and $R^1$, the phenyl and naphthyl radicals, and the ring A may or may not be substituted by groups which do not confer solubility.

In surface coatings, printing inks and plastics the novel colorants give yellow to red or brown very deep colorations which have good lightfastness, and fastness to weathering and to overspraying.

6 Claims, No Drawings

ISOINDOLINE COLORANTS

The present invention relates to novel isoindoline colorants.

The novel colorants have the general formula (I)

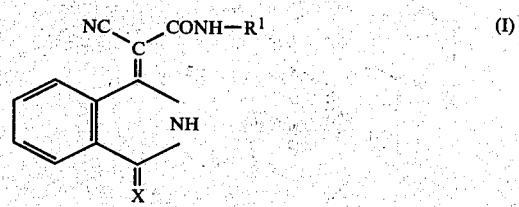

where $R^1$ is the radical of a 5-membered or 6-membered heterocyclic unsaturated ring, which may or may not be fused to a benzo ring, X is

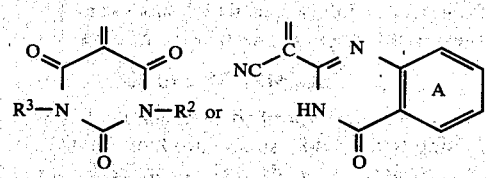

$R^2$ and $R^3$ independently of one another are hydrogen, $C_1$-$C_4$-alkyl, benzyl, phenyl or 1-naphthyl, and $R^1$, the phenyl and naphthyl radicals, and the ring A may or may not be substituted by groups which do not confer solubility.

The novel isoindoline colorants (I) are pigments having good tinctorial and technological properties. In surface coatings, printing inks and plastics, they give yellow to red or brown, very deep colorations which have good lightfastness and fastness to weathering and overspraying.

Examples of suitable 5-membered or 6-membered unsaturated heterocyclic radicals $R^1$ are

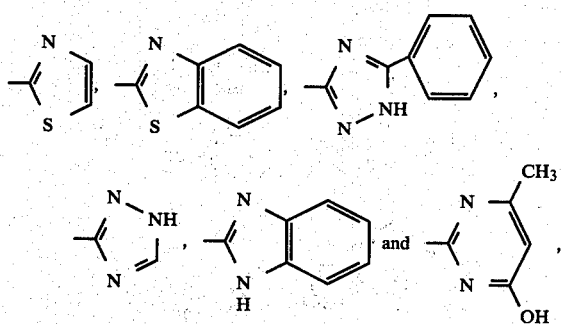

amongst which thiazol-2-yl and 1,2,4-triazol-3-yl are preferred.

Specific examples of $R^2$ and $R^3$, in addition to hydrogen are, amongst $C_1$-$C_4$-alkyl, n-butyl, sec.-butyl, isobutyl, isopropyl, n-propyl, ethyl and methyl, and, amongst others, phenyl, 1-naphthyl and benzyl, naphthyl and phenyl being unsubstituted or substituted by groups which do not confer solubility.

Groups (substituents) which do not confer solubility are, for the purposes of the invention, those which do not cause solubility of the colorant in water or in organic solvents. Examples of such substituents are halogen, alkyl or alkoxy of 1 to 6 carbon atoms, nitro, trifluoromethyl, carbamyl, ureido, sulfamyl and cyano; alkoxycarbonyl, alkanoyl, N-alkylcarbamyl, N-alkylureido and alkanoylamino, each of a total of 2 to 6 carbon atoms; alkylsulfonyl and alkylsulfamyl, each of 1 to 6 carbon atoms; aryloxycarbonyl, aroyl, aroylamino, arylsulfonyl, N-arylcarbamyl, N-arylsulfamyl, aryl, aryloxy, N-arylureido, arylazo and fused 5-membered and 6-membered hetero-rings containing a

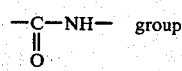

in the ring.

Preferred substituents which do not confer solubility are chlorine, bromine, methyl, ethyl, methoxy and/or ethoxy. The number of substituents is 0, 1 or 2, preferably 0 or 1.

For tinctorial and technological reasons, preferred colorants are those of the formula (IV)

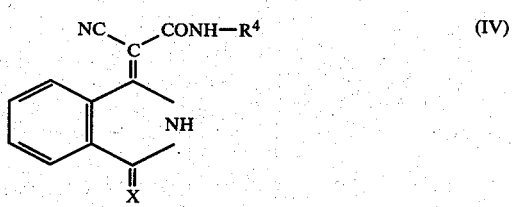

where
$R^4$ is thiazol-2-yl or 1,2,4-triazol-3-yl and
X has the above meanings.

Particularly preferred colorants of the formula (IV) are those wherein X is

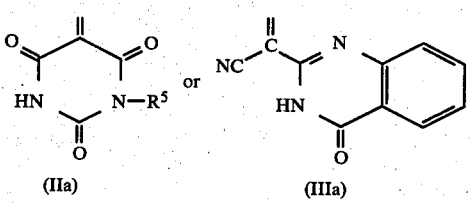

where $R^5$ is hydrogen, methyl or phenyl.

Very particularly preferred compounds are those of the formula (V)

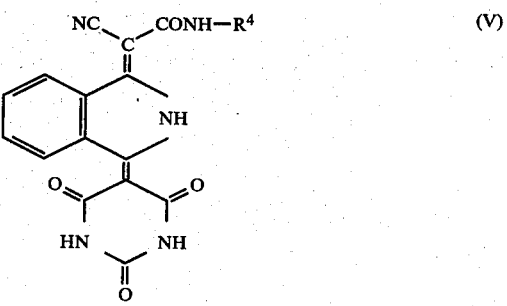

where $R^4$ has the above meanings.

The novel colorants are obtained in a conventional manner by condensing one mole of a compound (VI)

$$NC-CH_2-CONH-R^1 \qquad (VI)$$

with one mole of 1,3-diimino-isoindoline (VII) and then condensing the reaction product (semi-condensation product) of the formula

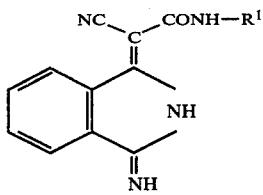

(VIII)

with one mole of a compound

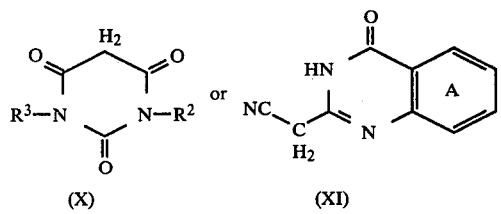

(X)   (XI)

$R^1$, $R^2$, $R^3$ and A having the above meanings.

The condensation of the diiminoisoindoline (VII) with the cyanomethylene-active compound of the formula VI is preferably carried out in water or in an organic solvent or diluent, for example an aliphatic alcohol of 1 to 4 carbon atoms, eg. methanol, ethanol, isopropanol or butanol, a glycol or glycol ether, an open-chain or cyclic amide, eg. dimethylformamide, dimethylacetamide or N-methylpyrrolidione, or a mixture of the above solvents. A slight excess of diiminoisoindoline can be of advantage. The amount of solvent and diluent is not critical and is chosen to make the reaction batch easy to stir or mix. The reaction is as a rule carried out at below 100° C.

The condensation of the semi-condensation product of the formula VIII with the CH-acidic compound of the formula X or XI is carried out in one of the above solvents or, preferably, in an aliphatic monocarboxylic acid, eg. acetic acid or propionic acid, at from 50° to 150° C.

Both the semi-condensation products of the formula VII and the pigments of the formula I precipitate out from the hot mixture and can be isolated by filtration and purified, if required, by washing with an organic solvent.

By carrying out the reaction under suitable conditions, it is also possible to effect both steps in the same vessel without intermediate isolation of the semi-condensation product of the formula VII.

The crude products obtained can in general be used as pigments. However, they can also be converted, by conventional conditioning processes, to the optimum pigmentary form for any particular application.

The Examples which follow illustrate the invention. Parts and percentages are by weight.

EXAMPLE 1

56 parts of 1-(cyano-1',2',4'-triazol-3'-yl-carbamyl-methylene)-3-iminoisoindoline and 28 parts of barbituric acid in 1,000 parts of glacial acetic acid are stirred under reflux for 3 hours. When the mixture has cooled, the colorant is filtered off, washed with glacial acetic acid and methanol and dried.

Yield: 74 parts of the colorant of the formula

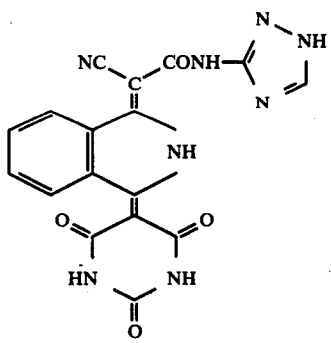

The colorant is obtained in a pigmentary form and can be directly incorporated into finishes, printing inks and plastics.

Pure yellow colorations which have very good light-fastness and fastness to plasticizer are obtained.

EXAMPLES 2 to 12

The procedure described in Example 1 is followed, but using semi-condensation products of the formula VIII and barbituric acids of the formula X, wherein $R^1$, $R^2$ and $R^3$ have the meanings shown in the Table which follows. The hues given by the colorants obtained are shown in the right-hand column.

| Example | $R^1$ | $R^2$ | $R^3$ | Hue |
| --- | --- | --- | --- | --- |
| 2 | ![thiazolyl] | —H | —H | brown |
| 3 | " | —CH$_3$ | —H | reddish brown |
| 4 | " | —C$_2$H$_5$ | —H | reddish brown |
| 5 | " | —C$_6$H$_5$ | —H | reddish brown |
| 6 | " | —C$_6$H$_4$Cl | —H | reddish brown |
| 7 | (methoxy-benzothiazolyl) | —H | —H | brown |
| 8 | (imidazolyl) | —C$_6$H$_5$ | —H | yellow |
| 9 | " | —C$_6$H$_4$CH$_3$ | —H | " |
| 10 | (phenyl-imidazolyl) | H | —H | " |

| Example | R¹ | R² | R³ | Hue |
|---|---|---|---|---|
| 11 | ![structure: indoline-N-methylene] | H | —H | brown |
| 12 | ![structure: 4-methyl-6-hydroxy-pyrimidinyl] | H | —H | yellow |

EXAMPLE 13

(a) 19.5 parts of 1-(cyano-1′,2′,4′-triazol-2′-yl-carbamyl-methylene)-3-iminoisoindoline and 14 parts of 2-cyanomethyl-quinazol-3-one in 300 parts of glacial acetic acid are refluxed for 3 hours. When the mixture was cooled, the colorant is filtered off, washed with glacial acetic acid and methanol, and dried.

Yield: 25 parts of the colorant of the formula

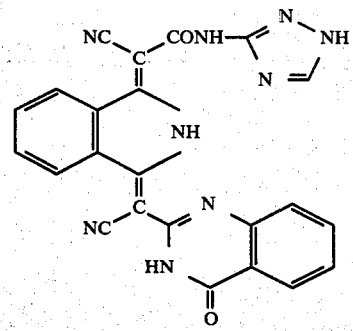

The colorant can be employed direct as a pigment. Yellowish red colorations having good light-fastness and fastness to overcoating are obtained.

(b) A high-hiding pigmentary form, which also has somewhat improved lightfastness, is obtained by stirring 10 parts of the colorant from (a) in a 10-fold amount of dimethylformamide for 2 hours at 110° C., filtering off the colorant whilst hot, washing it with dimethylformamide and methanol and drying it.

Yield: 9.5 parts.

EXAMPLES 14 to 20

The procedure described in Example 13 is followed, but using semi-condensation products of the formula VIII and cyanomethylquinazolones of the formula XI, wherein R¹ and the cyanomethylenequinazolone radical have the meanings shown in the Table which follows. The hue of the colorations obtained with the products is shown in the right-hand column.

| Example | R¹ | Cyanomethylene-quinazolone radical | Hue |
|---|---|---|---|
| 14 | ![thiazole structure] | ![cyanomethylene-quinazolone] | red |
| 15 | ![benzothiazole structure] | " | red |
| 16 | ![4-methoxy-benzothiazole structure] | " | reddish brown |
| 17 | ![imidazole-NH structure with phenyl] | " | red |
| 18 | ![benzimidazole structure] | " | brown |

| Example | R¹ | Cyanomethylene-quinazolone radical | Hue |
|---|---|---|---|
| 19 | (2-thiazolyl group) | (6-chloro quinazolone with cyanomethylene) | red |
| 20 | (benzothiazol-2-yl group) | (6-bromo quinazolone with cyanomethylene) | red |

EXAMPLE 21 (USE)

(a) Finish 10 parts of the colorant obtained in Example 1 and 95 parts of a baking finish containing 70% of coconut alkyd resin (60% strength solution in xylene) and 30% of melamine resin (about 55% strength solution in butanol/xylene) are ground in an attrition mill. The finish obtained is applied to cardboard and baked for 30 minutes at 120° C., giving yellow full-shade coatings having good lightfastness and fastness to overspraying. Yellow white reductions are obtained by admixture of titanium dioxide to the finish.

If the colorants described in Examples 2 to 20 are used, coatings having similar yellow to red hues and similar properties are obtained.

(b) Plastic 0.5 part of the colorant obtained in Example 1 is tumbled with 100 parts of polystyrene granules. The surface-colored granules are homogenized by extrusion at −190°–195° C. Very lightfast yellow extrudates are obtained.

If a mixture of 0.5 part of the colorant and 1 part of titanium dioxide is used, a high-hiding yellow coloration is obtained.

Similar colorations are obtained by using the pigments obtained according to Examples 2 to 20.

(c) Printing ink 8 parts of the pigment obtained in Example 1, 40 parts of a rosin modified with phenol-formaldehyde and 65 parts of toluene are thoroughly mixed in a disperser. A yellow toluene-based gravure ink is obtained. The prints produced with this ink have good lightfastness.

Similar results are obtained by using the colorants from Examples 2 to 20.

We claim:

1. An isoindoline colorant of the formula

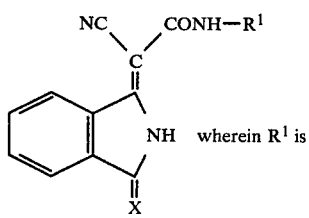

wherein R¹ is

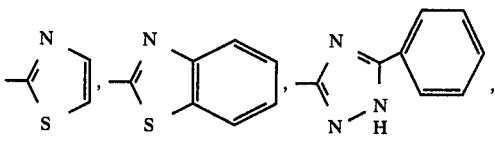

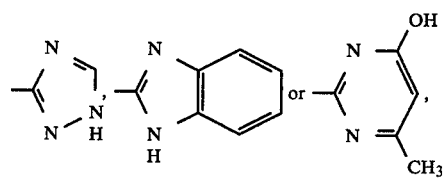

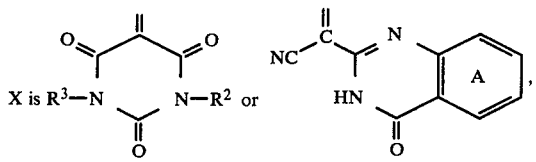

$R^2$ and $R^3$ independently of another are hydrogen, $C_1$–$C_4$-alkyl, benzyl, phenyl or 1-naphthyl and $R^1$, the phenyl and naphthyl radicals, and the ring A are unsubstituted or substituted by groups which do not cause solubility of the colorant in water or organic solvents.

2. An isoindoline colorant as claimed in claim 1, wherein $R^1$, the phenyl and naphthyl radicals and the ring A are unsubstituted or substituted by groups which do not confer solubility in water or in organic solvents selected from the group consisting of halogen, alkyl or alkoxy of 1 to 6 carbon atoms, nitro, trifluoromethyl, carbamyl, ureido, sulfamyl and cyano; alkoxycarbonyl, alkanoyl, N-alkylcarbamyl, N-alkylureido and alkanoylamino, each of a total of 2 to 6 carbon atoms; alkylsulfonyl and alkylsulfamyl, each of 1 to 6 carbon atoms; aryloxycarbonyl, aroyl, aroylamino, arylsulfonyl, N-arylcarbamyl, N-arylsulfamyl, aryl, aryloxy, N-arylureido, arylazo and fused 5-membered and 6-membered hetero-rings containing a $$-\underset{\underset{O}{\|}}{C}-NH-\ \text{group}$$

in the ring.

3. An isoindoline colorant as claimed in claim 1, wherein R¹, the phenyl and naphthyl radicals and the ring A are unsubstituted or substituted by chlorine, bromine, methyl, ethyl, methoxy or ethoxy, the number of substituents is 1 or 2 and in the latter case the substituents may be identical or different.

4. An isoindoline colorant of the formula

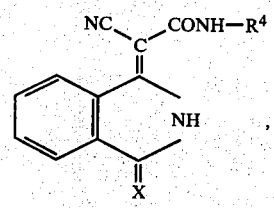

where R⁴ is thiazol-2-yl or 1,2,4-triazol-3-yl, X is

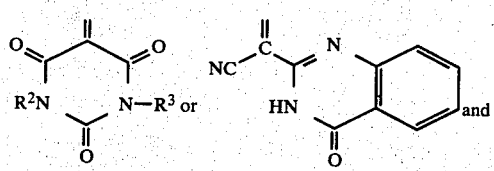

R² and R³, independently of one another, are hydrogen, C₁–C₄-alkyl, benzyl, phenyl or 1-naphthyl, and the phenyl and naphthyl radicals and the ring A may be unsubstituted or substituted by chlorine, bromine, methyl, ethyl, methoxy or ethoxy, the number of substituents is 1 or 2 and in the latter case the substituents may be identical or different.

5. An isoindoline colorant as claimed in claim 4, wherein X is

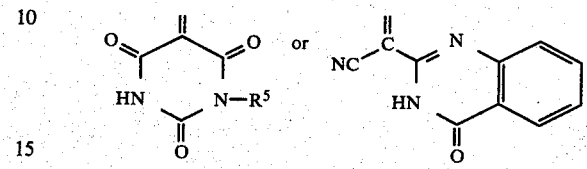

and R⁵ is hydrogen, methyl or phenyl.

6. An isoindoline colorant as claimed in claim 4, wherein X is

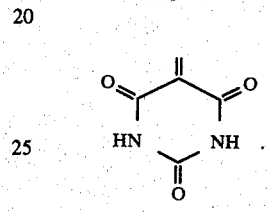

* * * * *